(12) United States Patent
Ng et al.

(10) Patent No.: US 8,474,870 B1
(45) Date of Patent: Jul. 2, 2013

(54) VEHICLE FRAME ASSEMBLY

(75) Inventors: Robert A. Ng, Dublin, OH (US); Brian E. Dressel, Columbus, OH (US); Kishore K. Pydimarry, Dublin, OH (US); David M. Edwards, Marysville, OH (US); Shawn T. Crichley, Dublin, OH (US); Takashi Nakano, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/457,660

(22) Filed: Apr. 27, 2012

(51) Int. Cl.
*B62D 21/12* (2006.01)

(52) U.S. Cl.
USPC ........... 280/785; 280/800; 280/790; 180/311; 296/187.11; 296/193.08; 296/203.04; 296/30

(58) Field of Classification Search
USPC .................. 280/785, 800, 790, 781; 180/311; 296/187.11, 193.08, 203.04, 203.01, 30, 296/29; 29/469
See application file for complete search history.

(56) References Cited

U.S. PATENT DOCUMENTS

| 4,093,254 | A | * | 6/1978 | Ezaki ............................. 280/783 |
| 4,462,629 | A | * | 7/1984 | Todori et al. .................... 296/30 |
| 6,409,216 | B2 | | 6/2002 | Suzuki |
| 6,679,540 | B1 | | 1/2004 | Graber et al. |
| 6,733,068 | B2 | | 5/2004 | Dogan et al. |
| 6,817,654 | B2 | | 11/2004 | Kitagawa et al. |
| 7,677,645 | B2 | | 3/2010 | Henkelmann |
| 7,959,217 | B2 | | 6/2011 | Onuma |
| 2009/0188100 | A1 | | 7/2009 | Durney et al. |

FOREIGN PATENT DOCUMENTS

| JP | 2001001091 A | * | 1/2001 |
| JP | 2011183827 A | * | 9/2011 |

* cited by examiner

*Primary Examiner* — Joseph Rocca
*Assistant Examiner* — Keith Frisby
(74) *Attorney, Agent, or Firm* — Rankin, Hill & Clark LLP

(57) ABSTRACT

A vehicle frame assembly includes a first frame member and a separate second frame member having an end portion connected to an end portion of the first frame member. A frame patch is interposed between and connected to the respective end portions of the first and second frame members. The frame patch together with the respective end portions of the first and second frame members defines a tri-layer patch configured to divide an input load applied longitudinally to the vehicle frame assembly into multiple force vectors which distribute the input load across a wide area of the vehicle frame assembly.

20 Claims, 6 Drawing Sheets

VEHICLE FRAME ASSEMBLY

BACKGROUND

Exemplary embodiments herein generally relate to a vehicle frame assembly, and more particularly, to a tri-layer frame structure for increased stiffness and load capability.

Box or squared shaped structures of a vehicle frame assembly can have unstable sidewalls that collapse and buckle during crash events. However, such frame structures are easy to manufacture and are conducive to assembly and welding processes. Because the sidewalls of these frame structures can lack strength, once the sidewalls have buckled, they easily fold over and deformation occurs. This is especially apparent in frame structures where an input load causes a pre-existing bend (due to layout or clearance requirements) in a frame member to fail because of sidewall buckling. Current designs for the box shaped frame structure can use a two-layer laminated patch which spans between adjoining frame structures. However, this two-layer laminated patch does not evenly split a load and, the sidewall can collapse and deform due to inadequate strength and stress concentration.

BRIEF DESCRIPTION

In accordance with one aspect, a vehicle frame assembly comprises a first frame member and a separate second frame member having an end portion connected to an end portion of the first frame member. A frame patch is interposed between and connected to the respective end portions of the first and second frame members. The frame patch together with the respective end portions of the first and second frame members define a tri-layer patch configured to divide an input load applied longitudinally to the vehicle frame assembly into multiple force vectors which distribute the input load across a wide area of the vehicle frame assembly.

In accordance with another aspect, a rear frame assembly for a vehicle comprises a first frame member having an elongated first channel and a second frame member separate from the first frame member and having an elongated second channel. An end portion of the second frame member is positioned in the first channel of the first frame member and connected to an end portion of the first frame member. A frame patch defines a patch channel. The frame patch is at least partially positioned in the first channel. The end portion of the second frame member is positioned in the patch channel. A section of the frame patch interposed between the respective end portions of the first and second frame members together with the respective end portions of the first and second frame members define a tri-layer patch. The tri-layer patch is configured to distribute an input load applied longitudinally to the vehicle rear frame assembly across a wide area of the rear frame assembly.

In accordance with yet another aspect, a rear frame assembly for a vehicle comprises a first frame member, a second frame member and a frame patch. The first frame member includes a pair of sidewalls and a bottom wall interconnecting the sidewalls. The first frame member defines an elongated first channel. The second frame member is separate from the first frame member and includes a pair of sidewalls and a bottom wall interconnecting the sidewalls. The second frame member defines an elongated second channel. An end portion of the second frame member is positioned in the first channel of the first frame member and connected to an end portion of the first frame member. The frame patch includes a pair of sidewalls and a bottom wall interconnecting the sidewalls, and defines a patch channel.

The frame patch includes a first end section, a second end section and a central section. The first end section is at least partially positioned in the first channel. The second end section is configured to receive the end portion of the second frame member. The central section is interposed between the respective end portions of the first and second frame members. The frame patch together with the respective end portions of the first and second frame members define a tri-layer patch extending in a longitudinal direction of both the first and second frame members. The tri-layer patch is configured to distribute an input load applied longitudinally to the vehicle rear frame assembly across a wide area of the rear frame assembly. The input load is divided into a shear load carried along the sidewalls of the frame patch, a mid-plane load carried along the bottom wall of the second frame member and the bottom wall of the second end section of the frame patch, and a bottom plane load carried along the entire bottom wall of the frame patch.

BRIEF DESCRIPTION OF THE DRAWINGS

FIG. 4 depicts an input load applied longitudinally to the vehicle frame assembly being divided into multiple force vectors which distribute the input load across a wider area of the vehicle frame assembly.

DETAILED DESCRIPTION

It should, of course, be understood that the description and drawings herein are merely illustrative and that various modifications and changes can be made in the structures disclosed without departing from the present disclosure. In general, the figures of the exemplary vehicle frame assembly are not to scale. It should be appreciated that the various identified components of the exemplary vehicle frame assembly disclosed herein are merely terms of art that may vary from one manufacturer to another and should not be deemed to limit the present disclosure.

Figure 8:
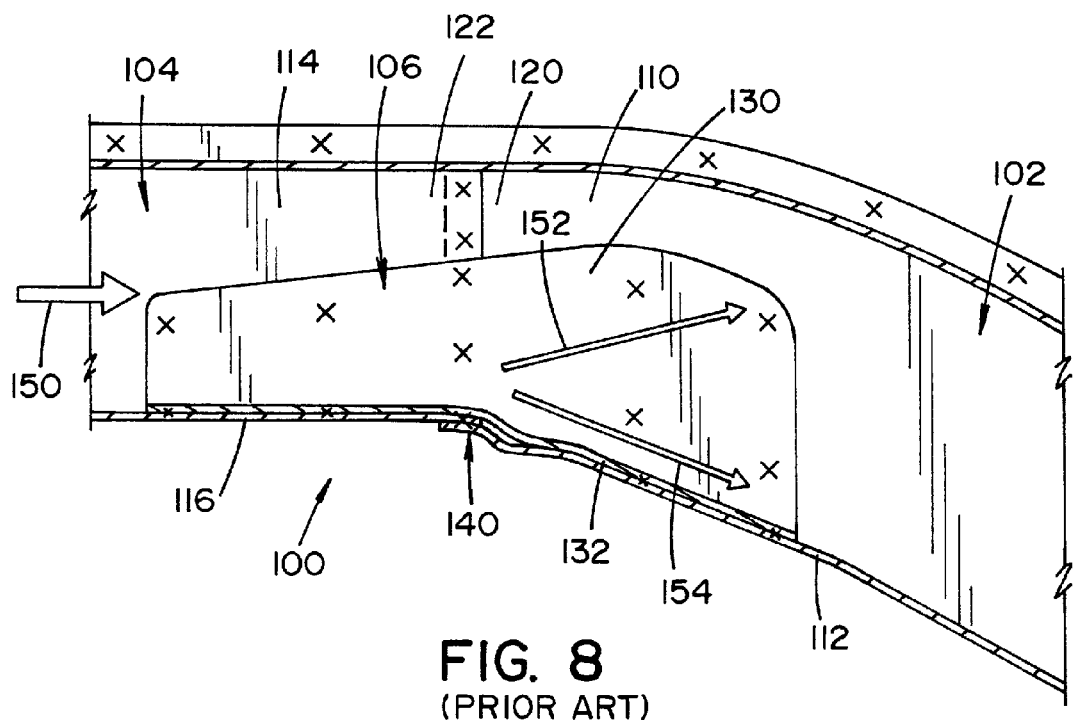
FIG. 8 is a cross-sectional view of a known vehicle frame member.

Referring now to the drawings, wherein like numerals refer to like parts throughout the several views, FIG. 8 schematically illustrates a known vehicle frame assembly 100. The vehicle frame assembly 100 generally comprises a first frame member 102, a second frame member 104 and a frame patch 106. The first frame member includes a sidewall 110 and a bottom wall 112. Similarly, the second frame member 104 includes a sidewall 114 and a bottom wall 116. An end portion 120 of the first frame member 102 is connected to an end portion 122 of the second frame member 104 via conventional manners, such as by welding. The frame patch 106 spans the adjoining respective end portions 120,122 of the first and second frame members 102,104, and includes a sidewall 130 and a bottom wall 132. As depicted, the bottom walls 112,116 of the respective first and second frame member 102,104 define a substantially continuous bottom wall of the vehicle frame member 100. Further, the bottom wall 132 of the frame patch 106 is laid over and is in substantially constant contact with the bottom walls 112,116. With this construction of the frame assembly 100, the frame patch 106 together with the end portions 120,122 define a two-layer laminated patch 140 that is configured to distribute an input load 150 applied longitudinally to the vehicle frame assembly 100 across the frame assembly. However, this two-layer laminated patch 140 does not evenly split the input load 150 across the frame assembly 100. Instead, the input load is divided into a shear load 152 carried along the sidewalls 110,114,130 and a bottom load 154 carried along the bottom walls 112,116, 132, which can cause a sidewall of the vehicle frame assembly 100 to collapse and deform due to inadequate strength and stress concentration.

Figure 1:
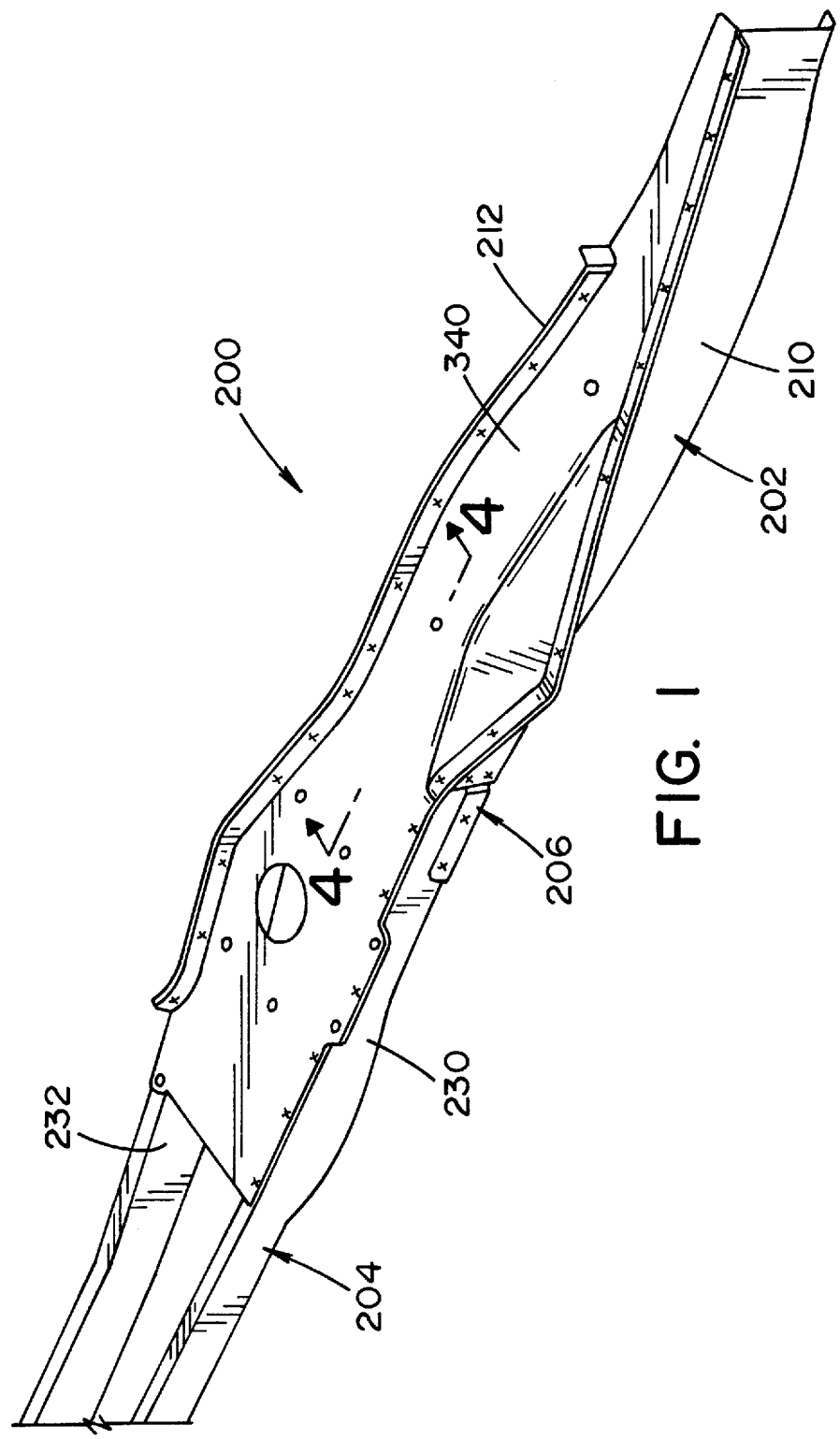
FIG. 1 is a perspective view of an exemplary vehicle frame member including a first frame member, a second frame member and a frame patch according to the present disclosure.
Figure 2:
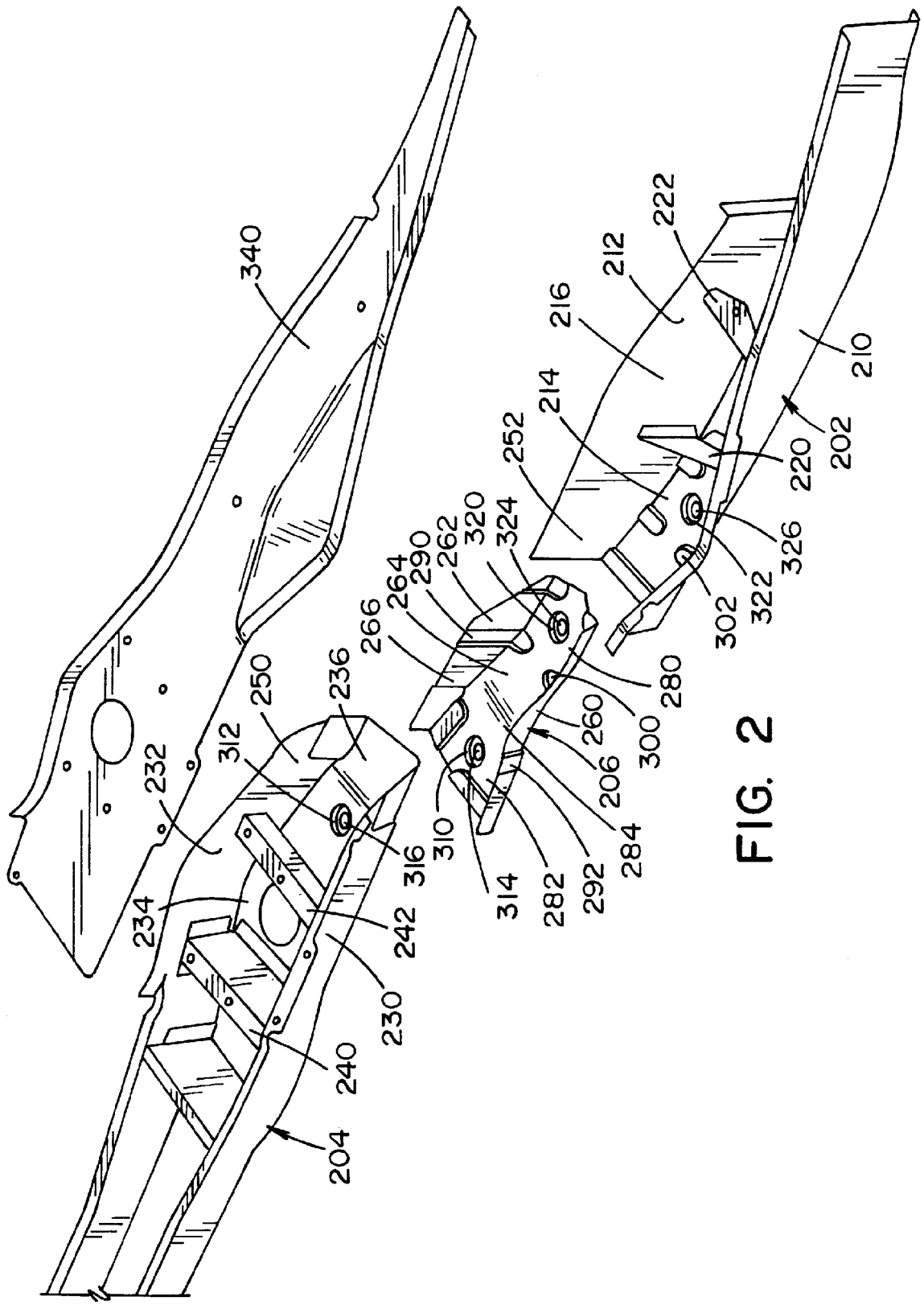
FIG. 2 is an exploded perspective view of the vehicle frame member of FIG. 1.
Figure 3:
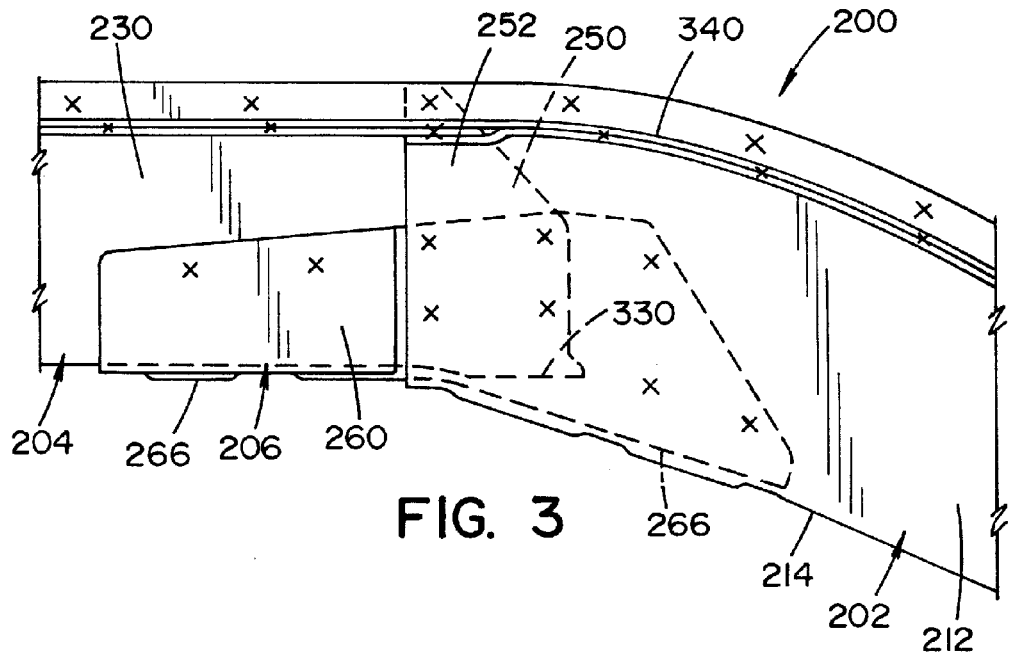
FIG. 3 is a partial side view of the vehicle frame member of FIG. 1.

FIGS. 1-3 schematically depict a vehicle frame assembly 200 according to the present disclosure. The vehicle frame assembly 200 can be part of a vehicle rear frame assembly, such as a frame rail, which can be formed in various lengths to accommodate elongated bed of varying lengths and/or elongated rear passenger compartments of varying lengths, though this is not required. Accordingly, although not shown, it should be appreciated that an additional vehicle frame member is spaced from the illustrated frame member 200 and longitudinally extends in a direction parallel to the illustrated frame assembly, so that at least one cross brace (not shown) extends therebetween. Similar to frame member 100, frame member 200 includes a first frame member 202, a second frame member 204 and a frame patch 206. The first frame member 202 includes a pair of sidewalls 210,212 and a bottom wall 214 interconnecting the sidewalls. The sidewalls 210,212 together with the bottom wall 214 define an elongated first channel 216, which can extend along an entire longitudinal extent of the first frame member 202. The sidewalls 210,212 may be generally parallel to one another as they extend from the bottom wall 214, and/or the sidewalls may extend toward or away from one another as they rise from the bottom wall. Strengthening members 220,222 can be positioned in the first channel 216 and secured to the sidewalls 210,212 and/or bottom wall 214 to provide strength and rigidity to the first frame member 202.

Similarly, the second frame member 204, which is separate from the first frame member 202, includes a pair of sidewalls 230,232 and a bottom wall 234 interconnecting the sidewalls. The sidewalls 230,232 together with the bottom wall 234 of the second frame member 204 define an elongated second channel 236, which can extend and entire longitudinal extent of the second frame member 204. Again, the sidewalls 230, 232 may be generally parallel to one another as they extend from the bottom wall 234, and/or the sidewalls may extend toward or away from one another as they rise from the bottom wall. Strengthening members 240,242 can also be provided in the second channel 236 and connected to the sidewalls 230, 232 and/or bottom wall 234 to provide strength and rigidity to the second frame member 204. In an assembled condition of the vehicle frame assembly 200 (see FIG. 1), an end portion 250 of the second frame member 204 is positioned in the first channel 216 of the first frame member 202 and is fixedly connected to an end portion 252 of the first frame member.

Figure 4:
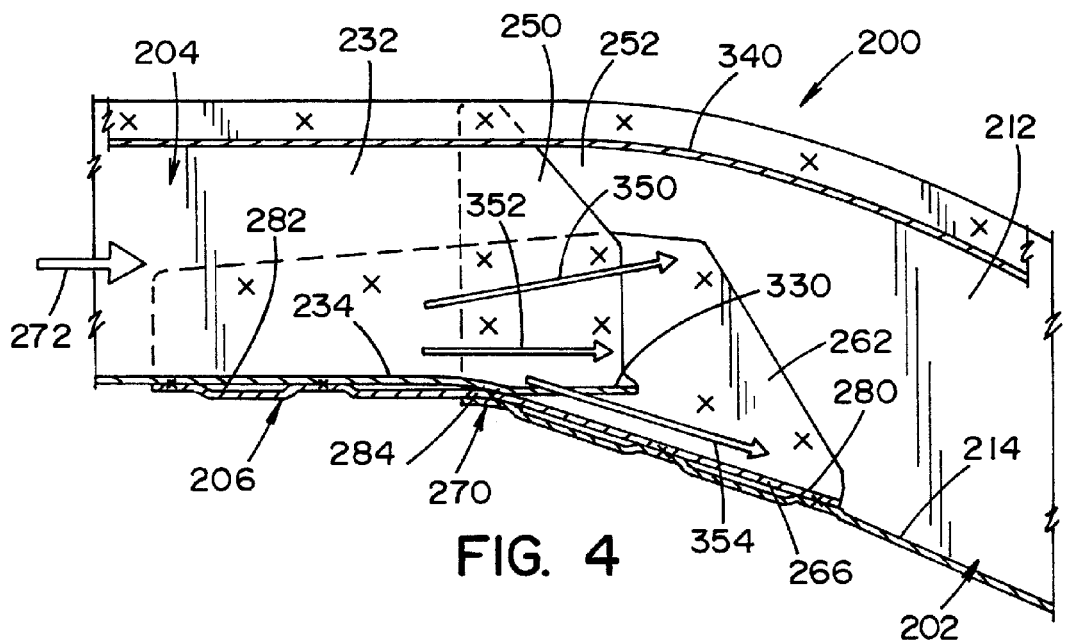
FIG. 4 is a cross-sectional view of the vehicle frame member of FIG. 1 taken along line 4-4 of FIG. 1.

The frame patch 206 extends in a longitudinal direction of both the first and second frame members 202,204 and is configured to span the adjoining respective end portions 252, 250 of the first and second frame members 202,204. With particular reference to FIGS. 2-4, the frame patch 206 includes a pair of sidewalls 260,262 and a bottom wall 264 interconnecting the sidewalls. The pair of sidewalls 260,262 together with the bottom wall 264 of the frame patch define a patch channel 266. The frame patch 206 includes first and second end sections 280,282 and a central section 284 disposed between the first and second end sections 280,282. Ends of the sidewalls 260,262 can converge downwardly toward the bottom wall 264 at the first end section 280 and are flared outwardly away from one another at the second end section 282 of the frame patch 206. At least one of the sidewalls 260,262 of the frame patch can include a strengthening member. In the depicted embodiment, each sidewall 260,262 includes a respective strengthening member 290,292, which can be in the form of an elongated rib extending perpendicularly from the bottom wall 264 along a height of each sidewall. It should be appreciated that the frame patch 206 is contoured to match the shape of the first and second frame members 202,204. For example, as best depicted in FIG. 4, the first end section 280 is canted downwardly relative to the second end section 282 to mirror the orientation of the first frame member 202 relative to the second frame member 204. As such, the frame patch 206 can be applied to first and second frame members 202, 204 where one of the frame members is elevated relative to the other of the frame members.

The frame patch 206 is interposed between and connected to the respective end portions 252,250 of the first and second frame members 202,204 and together with the respective end portions 252, 250 of the first and second frame members 202, 204 define a tri-layer patch 270 (see FIG. 4). As will be discussed in greater detail below, the frame patch 206, and particularly the tri-layer patch 270, is configured to divide an input load 272 applied longitudinally to the vehicle frame assembly 200, such as a longitudinally-directed compressive load applied to the second frame member 204, into multiple force paths or vectors which effectively distribute the input load 272 across a wider area of the vehicle frame assembly 200 as compared to the distribution of the input load 150 applied to the frame assembly 100 as depicted in FIG. 8.

To connect the frame patch 206 to the respective end portions 252,250 of the first and second frame members 202, 204, the first end section 280 of the frame patch is positioned in the first channel 216 of the first frame member 202. The second end section 282 of the frame patch 206 is positioned around the end portion 250 of the second frame member 204. That is, the end portion 250 of the second frame member 204 is positioned in the patch channel 266. With this arrangement, the first end section 280 is spaced from the end portion 250 of the second frame member 204 and is solely connected to the first frame member 202, and the second end section 282 is spaced from the end portion 252 of the first frame member 202 and is solely connected to the second frame member 204. The central section 284 is then interposed between and connected to the respective end portions 252,250 of the first and second frame members 202, 204. As shown in FIG. 4, in the assembled condition, the tri-layer patch 270 is defined by the sidewalls 210,212 and bottom walls 214 of the first frame member 202, the sidewalls 230,232 and bottom walls 234 of the second frame members 202, 204, and the sidewalls 260, 262 and bottom wall 264 of the frame patch 206.

With reference back to FIG. 2, the bottom wall 264 of the frame patch can include at least one weld joggle 300 and the bottom wall 214 of the first frame member 202 can include at least one corresponding weld joggle 302 for formability of the vehicle frame assembly 200 and welding of the frame patch 206 to the first frame member 202. To positively locate the end portion 250 of the second frame member 204 in the channel 266 of the frame patch, the second end section 282 of the frame patch 206 can include a depression 310 which mates with a corresponding depression 312 located on the end portion 250 of the second frame member 204. Each depression 310,312 can have a respective mounting/datum hole 314,316 for the passage of a datum pin (not shown). Similarly, to positively locate the frame patch 206 in the first channel 216 of the first frame member 202, the first end section 280 of the frame patch 206 can include a depression 320 which mates with a corresponding depression 322 on the end portion 252 of the first frame member 202. Each depression 320,322 can have a respective mounting/datum hole 324,326 for the passage of a datum pin (not shown).

In the assembled condition of the vehicle frame assembly 200 shown in FIG. 4, the end portion 250 of the second frame member 204 is positioned in the channel 266 of second end section 282 of the frame patch 206. Once properly positioned in the channel 266, the mounting holes 314,316 are aligned and a datum pin can be inserted in the holes to align the end portion 250 of the second frame member 204 within the channel 266 of the frame patch 206. Similarly, with the first end section 280 of the frame patch 206 properly positioned in the first channel 216 of the first frame member 202, the mounting holes 324,326 are aligned and a datum pin can extend through the holes to align the first end section 280 within the first channel 216. It should also be appreciated that the frame patch 206 can be connected to the first and second frame members 202,204 via conventional manners. For example, the first and second end sections 280,282 of the frame patch can be welded and/or riveted and/or adhered to the respective end portions 252,250 of the first and second frame members 202,204.

As shown in FIGS. 3 and 4, each of the sidewalls 260,262 of the frame patch 206 has a height less than a height of each of the sidewalls 210,212 of the first frame member 202 and each of the sidewalls 230,232 of the second frame member. The sidewalls 260,262 may be generally parallel to one another as they extend from the bottom wall 264, and/or the sidewalls may extend toward or away from one another as they rise from the bottom wall. The only requirement is that the sidewalls 260,262 substantially conform to the shapes of the respective sidewalls of the first and second frame members 202,204. Further, with the shape of the frame patch 206, the frame patch is configured to extend substantially about a perimeter of the respective end portions 252,250 of the first and second frame members 202, 204. As indicated previously, the first and second frame members 202,204 can be elevated with respect to one another. As such, in the depicted embodiment of the frame assembly 200, a section 330 of the end portion 250 of the second frame member is suspended above both the end portion 252 of the first frame member 202 and the frame patch 206. The bottom wall 264 of the first end section 280 lies substantially in constant contact with the bottom wall 214 of the end portion 252, and the bottom wall 264 of the second end section 282 lies substantially in constant contact with the bottom wall 234 of the end portion 250. The central section 284 is pinched between the end portion 250 and the end portion 252, with the section 330 projecting outwardly from the tri-layer patch 270. A frame cap 340 covers the respective end sections 252, 250 of the first and second frame members 202, 204 and a frame patch 206 in the assembled condition of the vehicle frame assembly 200.

Figure 5:
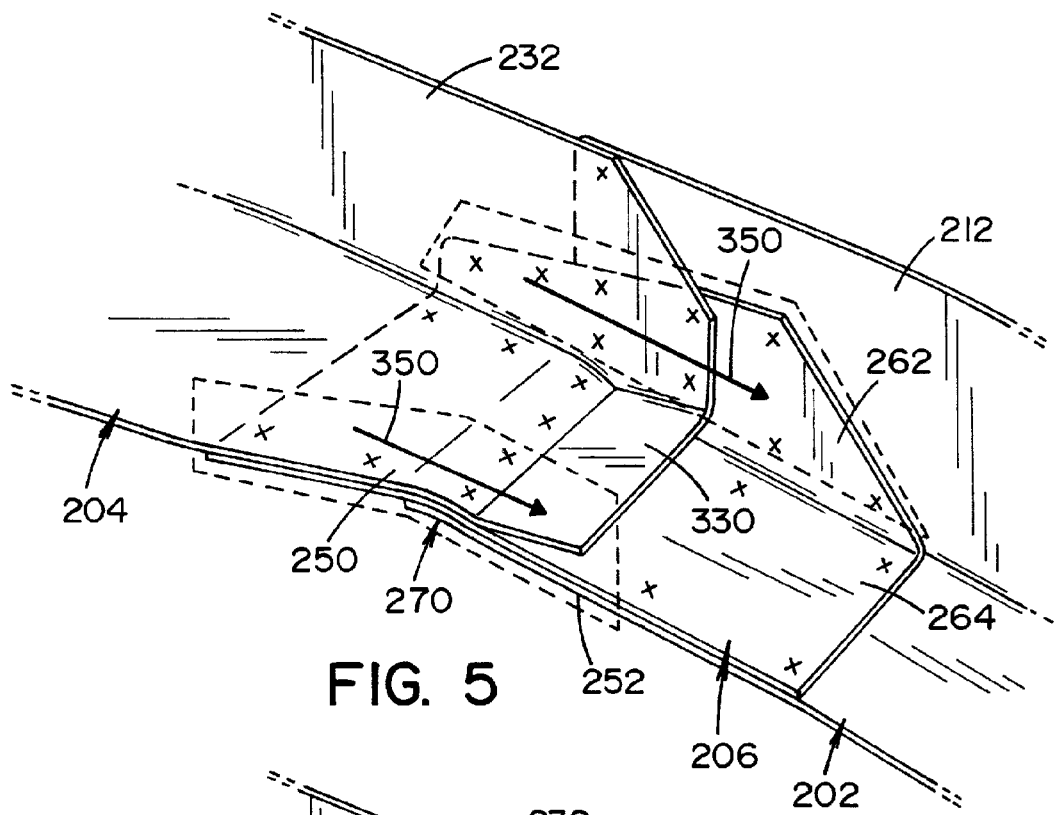
FIG. 5 is a partial perspective view of the vehicle frame member of FIG. 4 depicting a shear load carried by the frame patch.
Figure 6:
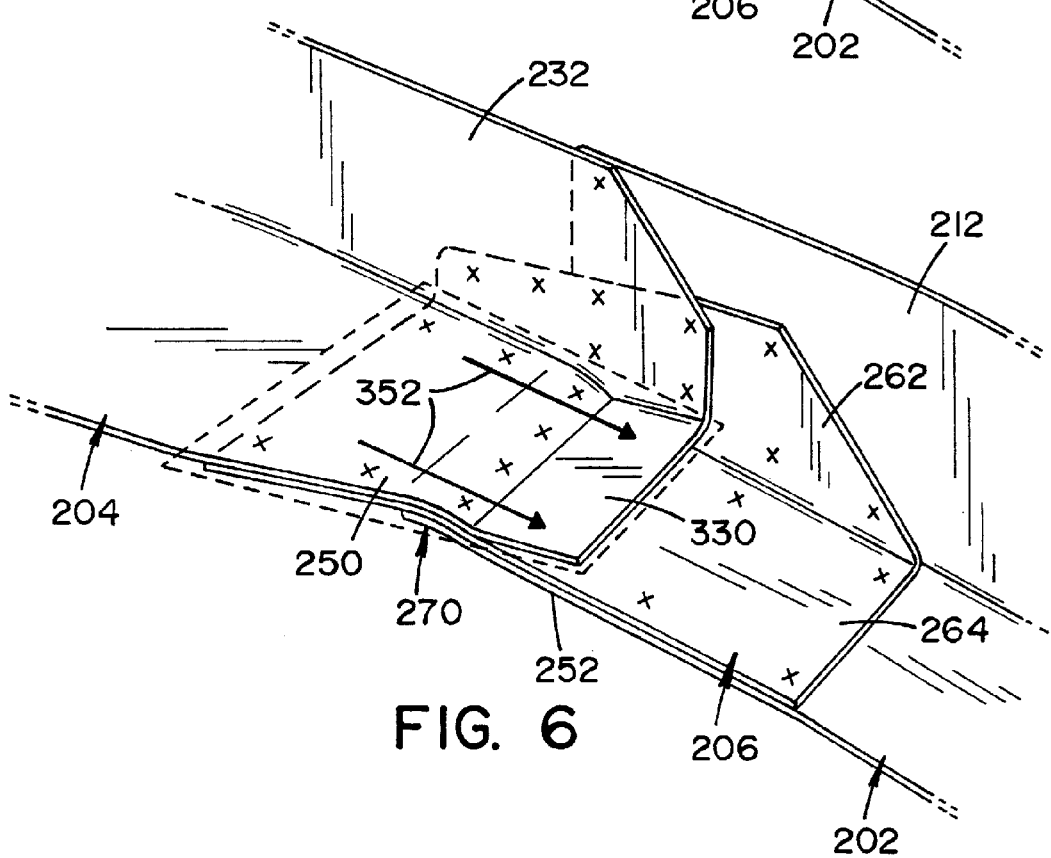
FIG. 6 is a partial perspective view of the vehicle frame member of FIG. 4 depicting a mid-plane load carried by the frame patch.
Figure 7:
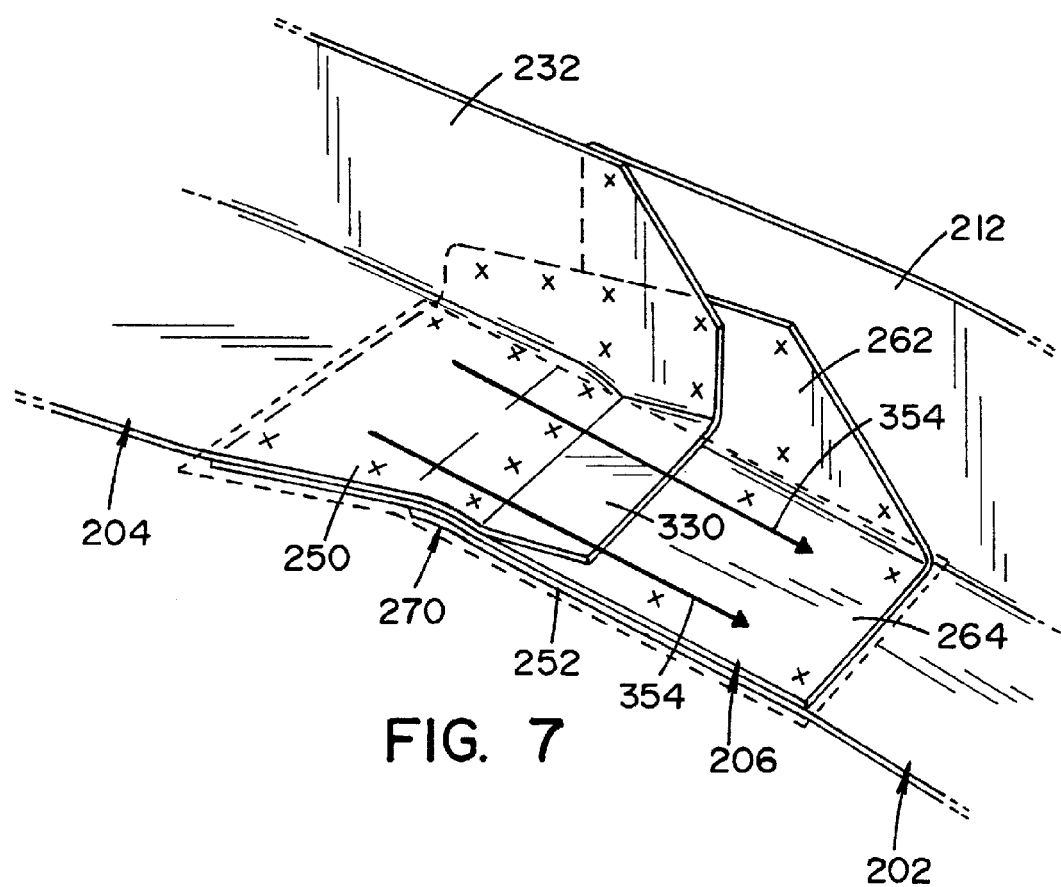
FIG. 7 is a partial perspective view of the vehicle frame member of FIG. 4 depicting a bottom plane load carried by the frame patch.

As stated above, the frame patch 206 together with the respective end portions 252, 250 of the first and second frame members 202, 204 define the tri-layer patch 270 which extends in a longitudinal direction of both the first and second frame members 202,204. The frame patch 206 with the defined tri-layer patch 270 are configured to effectively distribute the input load 272 applied longitudinally to the vehicle rear frame assembly 200 across a wider area of the frame assembly as compared to the distribution of the input load 150 applied to the frame assembly 100 as depicted in FIG. 8. To this end, the frame patch 206 divides the input load 272 into multiple force paths or vectors 350,352,354. As schematically shown in FIG. 5, force vector 350 is a shear load carried along the sidewalls 260, 262 of the frame patch 206. This shear load is also carried along the sidewalls 210,212 of the first frame member 202 and the sidewalls 230,232 of the second frame member 204. As schematically depicted in FIG. 6, force vector 352 is a mid-plane load carried along the bottom wall 234 of the second frame member 204 and along that portion of the bottom wall 264 of the frame patch 206 in the vicinity of the end portion 250 of the second frame member 204. This mid-plane load is localized in that area of the frame assembly 200 where the frame patch 206 is located and extends along the end portion 250 of the second frame member 204 including that section 330 of the end portion 250 that is suspended above the frame patch 206. As schematically shown in FIG. 7, force vector 354 is a bottom plane load carried along substantially the entire bottom wall 264 of the frame patch 206. This bottom plane load is also carried by the respective bottom walls 214,234 of the end portions 252,254 of the first and second frame members 202, 204.

As is evident from the foregoing, the exemplary vehicle frame assembly 200 includes the frame patch 206 which spans the adjoining first and second frame members 202,204 and defines the tri-layer structure or patch 270. The tri-layer patch 270 is oriented in the direction of the longitudinally-directed input load 272 and is configured to effectively split the input load 272 into three force paths or vectors 350,352, 354 which correspond to a shear load, a mid-plane load and a bottom plane load. This ensures that the input load 272 is evenly distributed across a wider area of the vehicle frame assembly 200 during a crash event. By doing so, major frame wall buckling is avoided. In addition, local stress concentration is also reduced. Accordingly, the exemplary vehicle frame assembly 200 prevents frame wall buckling by better distributing the input load over a wider area.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A vehicle frame assembly comprising:
a first frame member;
a separate second frame member having an end portion connected to an end portion of the first frame member; and
a frame patch interposed between and connected to the respective end portions of the first and second frame members, the frame patch together with the respective end portions of the first and second frame members defining a tri-layer patch configured to divide an input load applied longitudinally to the vehicle frame assem- bly into multiple force vectors which distribute the input force across a wide area of the vehicle frame assembly.

2. The vehicle frame assembly of claim 1, wherein the frame patch includes first and second end sections and a central section disposed between the first and second end sections, the central section being interposed between and connected to the first and second frame members.

3. The vehicle frame assembly of claim 2, wherein the first end section is spaced from the end portion of the second frame member and solely connected to the first frame member and the second end section is spaced from the end portion of the first frame member and is solely connected to the second frame member.

4. The vehicle frame assembly of claim 2 wherein each of the first and second frame members is channel shaped and includes a pair of sidewalls and a bottom wall interconnecting the sidewalls, the first end section of the frame patch being positioned in the first frame member and the second end section of the frame patch being positioned around the second frame member.

5. The vehicle frame assembly of claim 4, wherein the frame patch is channel-shaped and includes a pair of sidewalls and a bottom wall interconnecting the sidewalls, wherein the tri-layer patch is defined by the respective sidewalls and bottom wall of the first and second frame members and the sidewalls and bottom wall of the frame patch.

6. The vehicle frame assembly of claim 5, wherein to align the frame patch in the first frame member the bottom wall of the frame patch including at least one datum hole and the bottom wall of the first frame member includes at least one corresponding datum.

7. The vehicle frame assembly of claim 5, wherein at least one of the sidewalls of the frame patch includes a strengthening member, each of the sidewalls of the frame patch having a height less than a height of each of the respective sidewalls of the first and second frame members.

8. The vehicle frame assembly of claim 5, wherein the sidewalls of the frame patch converge downwardly toward the interconnecting bottom wall of the frame patch at the first end section and are flared outwardly away from one another at the second end section of the frame patch.

9. The vehicle frame assembly of claim 1, wherein the first and second frame members define a rear frame rail of the vehicle frame assembly.

10. The vehicle frame assembly of claim 1, wherein one of the force vectors is a shear load carried along sidewalls of the frame patch, another one of the force vectors is a mid-plane load carried along a bottom wall of the second frame member and a portion of a bottom wall of the frame patch in a vicinity of the end portion of the second frame member, and another one of the force vectors is a bottom plane load carried along substantially the entire bottom wall of the frame patch.

11. The vehicle frame assembly of claim 10, further including a frame cap for covering the respective end sections of the first and second frame members and the frame patch.

12. The vehicle frame assembly of claim 1, wherein the tri-layer patch extends in a longitudinal direction of both the first and second frame members and extends substantially about a perimeter of the respective end portions of the first and second frame members.

13. A rear frame assembly for a vehicle comprising:
a first frame member having an elongated first channel;
a second frame member separate from the first frame member and having an elongated second channel, an end portion of the second frame member being positioned in the first channel of the first frame member and connected to an end portion of the first frame member; and
a frame patch defining a patch channel, the frame patch being at least partially positioned in the first channel, the end portion of the second frame member being positioned in the patch channel, a section of the frame patch interposed between the respective end portions of the first and second frame members together with the respective end portions of the first and second frame members defining a tri-layer patch, the tri-layer patch configured to distribute an input load applied longitudinally to the vehicle rear frame assembly across a wide area of the rear frame assembly.

14. The rear frame assembly of claim 13, wherein the frame patch extends in a longitudinal direction of both the first and second frame members.

15. The rear frame assembly of claim 14, wherein the frame patch is configured to extend substantially about a perimeter of the respective end portions of the first and second frame members.

16. The rear frame assembly of claim 13, wherein the frame patch includes first and second end sections, the first end section being positioned in the first channel of the first frame member, the second end section of the second frame member being positioned in the patch channel of the second end section of the frame patch.

17. The rear frame assembly of claim 16, wherein a section of the end portion of the second frame member is suspended above the frame patch.

18. The rear frame assembly of claim 13, wherein the tri-layer patch is configured to divide the input load applied longitudinally to the vehicle frame assembly into multiple force vectors, wherein one of the force vectors is a shear load carried along sidewalls of the frame patch, another one of the force vectors is a mid-plane load carried along a bottom wall of the second frame member and a portion of a bottom wall of the frame patch in a vicinity of the end portion of the second frame member, and another one of the force vectors is a bottom plane load carried along substantially the entire bottom wall of the frame patch.

19. A rear frame assembly for a vehicle comprising:
a first frame member including a pair of sidewalls and a bottom wall interconnecting the sidewalls, the first frame member defining an elongated first channel;
a second frame member separate from the first frame member and including a pair of sidewalls and a bottom wall interconnecting the sidewalls, the second frame member defining an elongated second channel, an end portion of the second frame member being positioned in the first channel of the first frame member and connected to an end portion of the first frame member; and
a frame patch including a pair of sidewalls and a bottom wall interconnecting the sidewalls, the frame patch defining a patch channel, the frame patch including a first end section, a second end section and a central section, the first end section at least partially positioned in the first channel, the second end section configured to receive the end portion of the second frame member, a section of the end portion of the second frame member being suspended above the frame patch, the central section interposed between the respective end portions of the first and second frame members,
wherein the frame patch together with the respective end portions of the first and second frame members define a tri-layer patch extending in a longitudinal direction of both the first and second frame members,
wherein the tri-layer patch is configured to distribute an input load applied longitudinally to the vehicle rear frame assembly across a wide area of the rear frame assembly, the input load being divided into a shear load carried along the sidewalls of the frame patch, a midplane load carried along a bottom wall of the second frame member and the bottom wall of the second end section of the frame patch, and a bottom plane load carried along the entire bottom wall of the frame patch.

20. The rear frame assembly of claim 19, wherein the tri-layer patch is defined by the respective sidewalls and bottom wall of the first and second frame members and the sidewalls and bottom wall of the frame patch.

* * * * *